United States Patent [19]

Ogman

[11] Patent Number: 4,497,163
[45] Date of Patent: Feb. 5, 1985

[54] APPARATUS TO SLICE A LARGE ROUND BALE

[75] Inventor: Abraham Ogman, Peabody, Mass.

[73] Assignee: The Paul Revere Corporation, Coldwater, Ohio

[21] Appl. No.: 526,756

[22] Filed: Aug. 26, 1983

[51] Int. Cl.³ .............................................. A01D 75/00
[52] U.S. Cl. ...................................... 56/341; 100/88; 56/DIG. 5
[58] Field of Search ................... 56/341, 344, DIG. 5; 100/88, 89, 98 R, 98 A, 39; 242/56.2, 56.3, DIG. 3; 83/411 R, 733

[56] References Cited

U.S. PATENT DOCUMENTS 3,691,941 9/1972 Molitorisz .............................. 100/89
3,834,141 9/1974 Bracht et al. .................... 56/DIG. 5
4,330,985 5/1982 Shindelar ............................... 56/341

Primary Examiner—Gene Mancene
Assistant Examiner—David L. Tarnoff
Attorney, Agent, or Firm—Abraham Ogman

[57] ABSTRACT

Apparatus is presented for slicing a large round bale into two or more parts prior to discharge from the baler. Slicing is accomplished by inserting a knife blade into the bale-forming chamber during or subsequent to the tying-off event while the bale rotates. The cutting means is inserted into the sidewalls of the baler and into the baling chamber. As the bale is rotated, the cutting means cuts the bale. Typically, a ring and core are formed. The preferred configurations of the core are cylinders or conical structures.

6 Claims, 5 Drawing Figures

U.S. Patent  Feb. 5, 1985  Sheet 1 of 4  4,497,163

APPARATUS TO SLICE A LARGE ROUND BALE

BACKGROUND OF THE INVENTION

This invention relates to generally a round bale-forming machine and, more particularly, to apparatus for slicing the bale into two or more parts by means of a cutter mounted in the sidewalls of the baler.

Many bale-forming machines exist which form fibrous agricultural crops into bales that are either twine or wire tied. For example, U.S. Pat. No. 4,319,466 to Arnold et al discloses a method for forming large round bales in a machine comprising a cage-like frame having a horizontal axis and a generally cylindrical shaped baling zone. Upwardly extending machine sidewalls form the confining end surfaces of the baling zone. A plurality of serially arranged conveying elements enclose and generally define the circumferential periphery of the baling zone. Thus the size of the baling chamber remains constant during the bale-forming process. To accomplish discharge of a completed bale, the baling chamber is divided into two portions approximately along a vertically extending axis cutting plane. The rear portion of the housing is then configured to swing upward from a hinge point at the top, thereby allowing the bale to be discharged rearward.

U.S. Pat. No. 4,402,176 which is assigned to the same assignee as this application, discloses bale-forming means wherein the hinge point of the discharge gate differs somewhat from the above-described Arnold et al patent. A key element in the implementation is the placement of the hinge point of the discharge gate. It is at the most forward edge of the baling chamber, putting it generally at the same height above ground as the central axis of the chamber. The movable upper section comprises a subframe covered by protective panels including a pair of spaced-apart sidewalls mounted at right angles to the central axis of the baling chamber. Also situated in the movable upper section are all of the conveying elements with the exception of the bottom conveyor. This includes those conveying elements which are serially disposed around the rear, top, and front of the generally cylindrical periphery of the baling zone. This means that only the bottom conveyor is not enclosed in that portion of the baler which swings upward like a clam shell to provide a tailgate through which a completed bale can be discharged.

Each conveyor element in the upper section comprises a plurality of side-by-side belts which are entrained on first and second spaced-apart rollers having horizontal axes, the ends of each roller being journalled in the sidewalls of the movable upper section. The rollers at the downstream end of each conveying element are synchronously driven from the PTO of the tractor. There is a space between the last of the serially arranged conveying elements and the uppermost surface of the bottom conveyor. This space provides an inlet to the baling chamber which extends the full width of the baler. The outwardly extending axial shaft of the last downstream roller additionally serves as the hinge point around which the upper section pivots. A hydraulically actuated piston appropriately mounted between the upper section subframe and a location on the main frame just forward of the hinge point serves as a motive force to open and close the tailgate.

This invention improves on the baler of Arnold et al in that a capability is provided for slicing the bale into two or more parts. The prior art Arnold et al baler generates large round bales which are 5 feet long. As such, they do not always fit through the doors which provide access to the feed alleyway in front of the cattle stanchions. Providing the hay baler with the option to produce two bales, makes it possible for the livestock owner to reach his feeding alleyway when it is accessible through a narrow doorway.

SUMMARY OF THE INVENTION

It is an object of this invention to provide a simple-to-operate means of slicing a large round bale of fibrous agricultural crop material into two or more parts. The baler that was first reduced to practice forms generally cylindrical bales in a chamber of fixed size. During the bale-forming process, the partially completed bale rotates on a horizontal axis while crop material picked up from a windrow is continuously added to the periphery of the bale. As the baling chamber fills, pressure is exerted on the peripheral elements of the enclosure. The enclosure is hinged along the front edge to allow the upper section to open like a clam shell for rearward discharge of a completed bale. A latch mechanism holds the opposing faces of the enclosure together until the bale is complete.

A key element in the implementation of this invention is the fact that the bale rotates within the machine as it forms. Further, a fully formed bale presses firmly outward against the confining belts ensuring that the almost completed bale cannot readily be stopped from turning. Thus, a stationary knife means driven into the heart of the slowly turning bale will server it.

The knife for slicing the bale can be inserted between the belts which encircle the periphery of the baling chamber. As implemented, this was done by using a long knife blade mounted at its butt end to the center of a T-shaped crossbar. One end of the crossbar was hinge-mounted to the top rear midpoint of the baler. The second end of the crossbar was pivotally mounted to the piston shaft of a hydraulic cylinder. The second end of the hydraulic cylinder is pivotally mounted to the top front midpoint of the baler. In the unactivated state of the cylinder wherein the shaft is in its extended position, the top edge of the knife blade will clear the top front roller of the bale chamber. Activation of the cylinder to draw the shaft inward serves to rotate the sharp edge of the blade against the rotating bale. When the shaft is fully drawn into the cylinder, the tip of the blade will reach the center of the bale. Care has to be taken in dimensioning the T-shaped crossbar and the throw of the hydraulic cylinder so that the knife blade will clear both the front and back rollers and at the same time be able to reach the center of the bale. The knife blade, in the unit reduced to practice, was sharpened in a conventional manner. However, it is forseen that a serrated edge type knife would better cut some agricultural products.

Using this improved baler, the operator does not have to sever all bales made in the machine. Some bales can be produced which are the full 5 feet long. Others can be divided into two bales each 2½ feet long. The mix of long and short bales is completely under the control of the operator. The type of tie mechanism used when producing bales from this machine is already known in the art and consists of independently tying each of the two halves of the bale on a simultaneous basis.

DESCRIPTION OF THE PREFERRED EMBODIMENT

Figure 1:
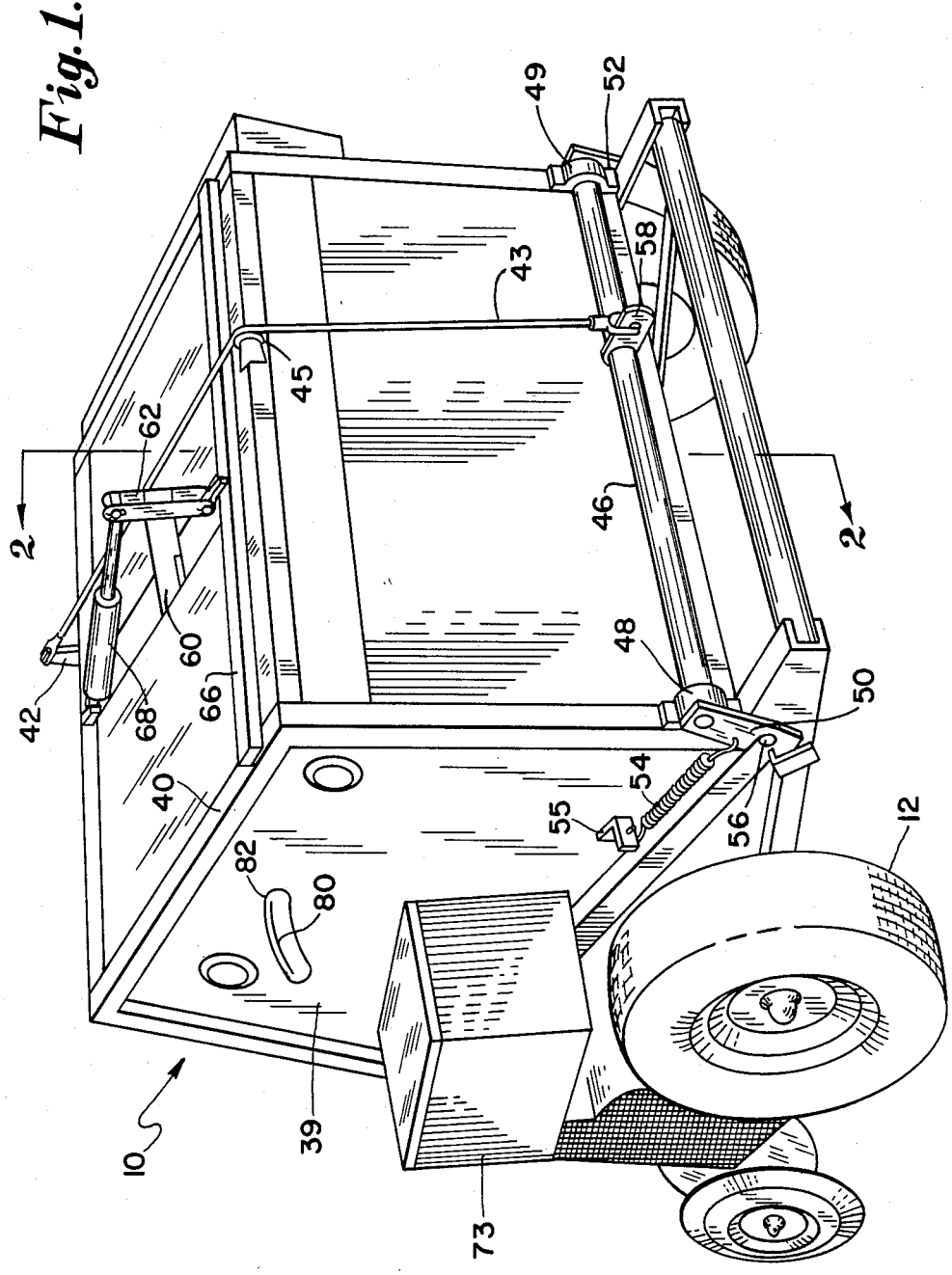
FIG. 1 is an isometric rear view of the baler.

FIG. 1 shows a rear view of a baler 10 which is capable of gathering crop material from a windrow and forming it into round bales generally cylindrical in shape. Baler 10 is supported by a pair of wheels 12. The baler is intended to be drawn behind a tractor and to be powered therefrom by means of a power-take off and hydraulic oil lines. The manner in which the baler operates is better seen by reference to FIG. 2. Baler 10 having wheels 12 supported from frame 14 is drawn behind a tractor by tongue 16 and a hitch (not shown). When appropriately drawn behind a tractor, astride a windrow of crop material, the baler gathers up the crop by means of pickup reel 18.

Pickup reel 18 delivers the crop material to a conveyor which forms the bottom of the baling zone. The conveyor comprises a plurality of side-by-side belts 20 which are carried over transversely extending rollers 22, 24, 26, and 28. In the unit reduced to practice, five belts 20 were used to span a baling chamber 5 feet long. Rollers 24, 26, and 28 are generally on the periphery of the cylindrical shaped baling zone 23. Roller 22 is mounted lower than roller 24. This is done so that a line drawn tangent from the top of pickup reel 18 to the top of roller 24 passes tangentially over roller 22.

Above the bottom conveyor is a series of independent conveyor assemblies which generally surround the cylindrical baling zone. Three such conveyor assemblies are shown. As implemented, they are of identical configuration. The rearmost of the serially arranged conveyor assemblies consists of upstream roller 29, downstream roller 31 and a multiplicity of side-by-side conveyor belts 30. Similarly, the topside conveyor assembly consists of downstream roller 35, upstream roller 33 and conveyor belts 32. The front conveyor assembly is made up of belts 34, downstream roller 36 and upstream roller 37. Rollers 29, 31, 33, 35 and 37 are journalled for rotation in the sidewalls 39 of subframe 40. Subframe 40 is hinged at the front by the bearings (not shown) which secure the extended shaft of roller 36 to main frame 15. Pivoting of subframe 40 about roller 36 allows its rear edge to swing upward to provide a tailgate through which a completed bale can be discharged.

A latching mechanism to maintain the tailgate in a closed position is shown in FIG. 1. As shown in FIG. 1, the latch assembly comprises a transversely extending torque tube 46 rotatably mounted in bearing plates 48 and 49. On the left end of torque tube 46 is a first member in the form of latch plate 50. On the right end is a second like latch plate 52. There is a spring 54 having one end attached to latch plate 50 and its second end anchored to a bracket 55 that is secured to subframe 40.

Spring 54 holds latch plate 50 against a pin 56 which is anchored to the baler frame. A slot formed in latch plate 50 allows the latch plate to lock the tailgate in the closed position. Latch plate 52 also has a similar slot which operates in conjunction with another pin extending from the far side of the baler frame. There is also a second spring 54 on the right side of the baler.

A crankarm 58 extends rearward from torque tube 46. A clevis arrangement secures one end of cable 43 to the outer end of crankarm 58. The second end of cable 43 is secured by means of a second clevis to pivot arm 42. Idler pulley 45 allows cable 43 to change directions and make connection with the end of pivot arm 42. An upward pull on cable 43 rotates the torque tube so that latch plates 50 and 52 are released from left side pin 56 and the pin to which latch 52 attaches. Release of the pull on cable 43 allows springs 54 to relatch the plates 50 and 52 to pins 56.

Figure 2:
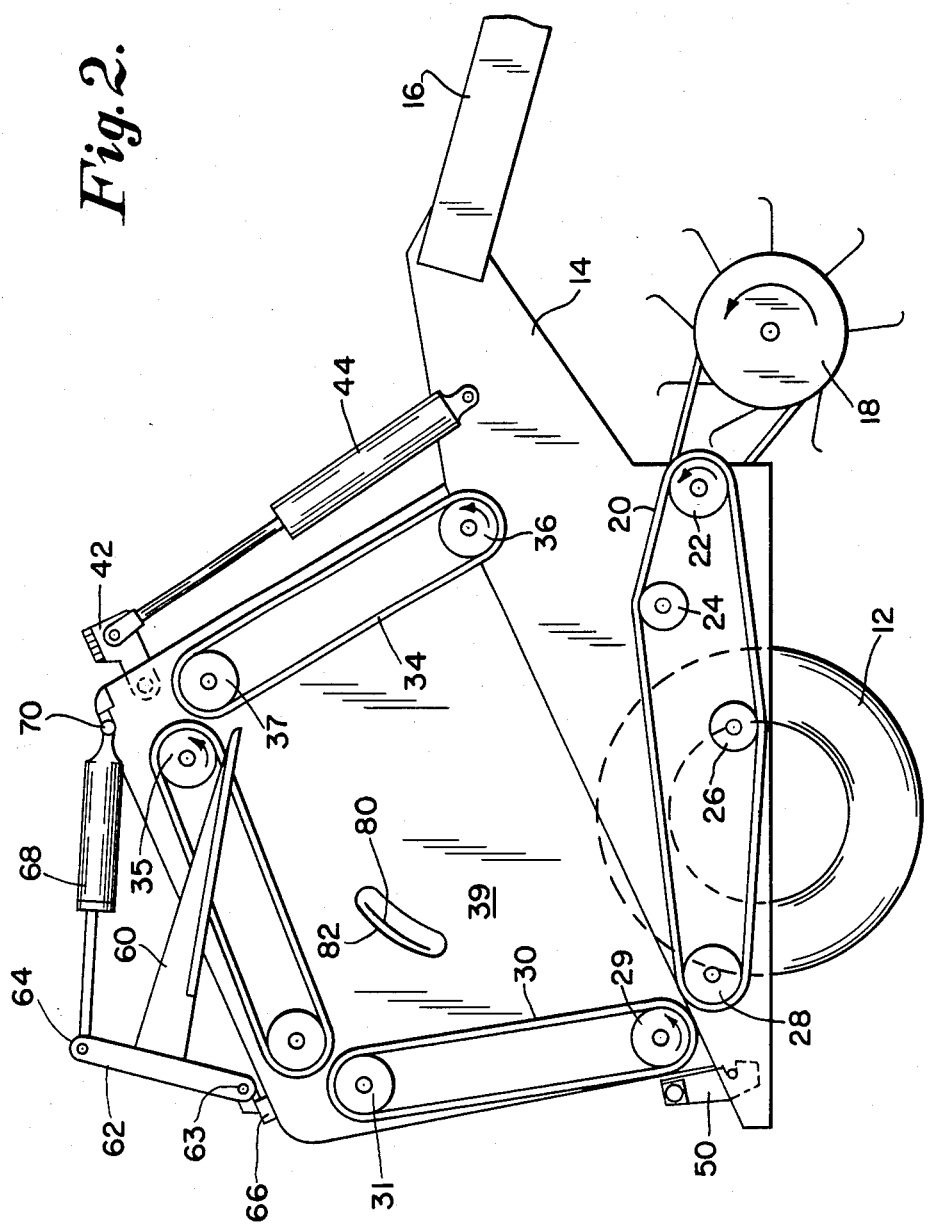
FIG. 2 is a cutaway view of the baler taken along line 2—2 of FIG. 1 and showing the knife in the neutral position.

As the bale is formed, it rotates in a clockwise direction as viewed in FIG. 2. Rotation is brought about by contact with belts 20, 30, 32 and 34 which move in the direction shown by the arrows shown in rollers 22, 29, 35 and 36. As the baling chamber fills, the outward pressure of the compressed crop strands stretches the belts taut so that they assume the configuration shown in FIG. 3. As the baling chamber becomes full, compressive forces exerted on the bale tend to force the tailgate open. An appropriately calibrated sensor can be incorporated into the latch assembly to signal that the bale is ready for discharge.

When the "chamber full" status is sensed, the operator stops the forward motion of the tractor, terminating pickup from the windrow, thereby allowing the crop material at the pickup reel 18 to be carried on into the baling chamber. This done, the bale tying sequence is begun either manually or automatically using spools of twine carried in storage box 73 (See FIG. 1). On completion of the bale tying event, hydraulic cylinder 44 is actuated to move subframe 40 upward about pivot point 36 to enable discharge of the completed bale.

Figure 3:
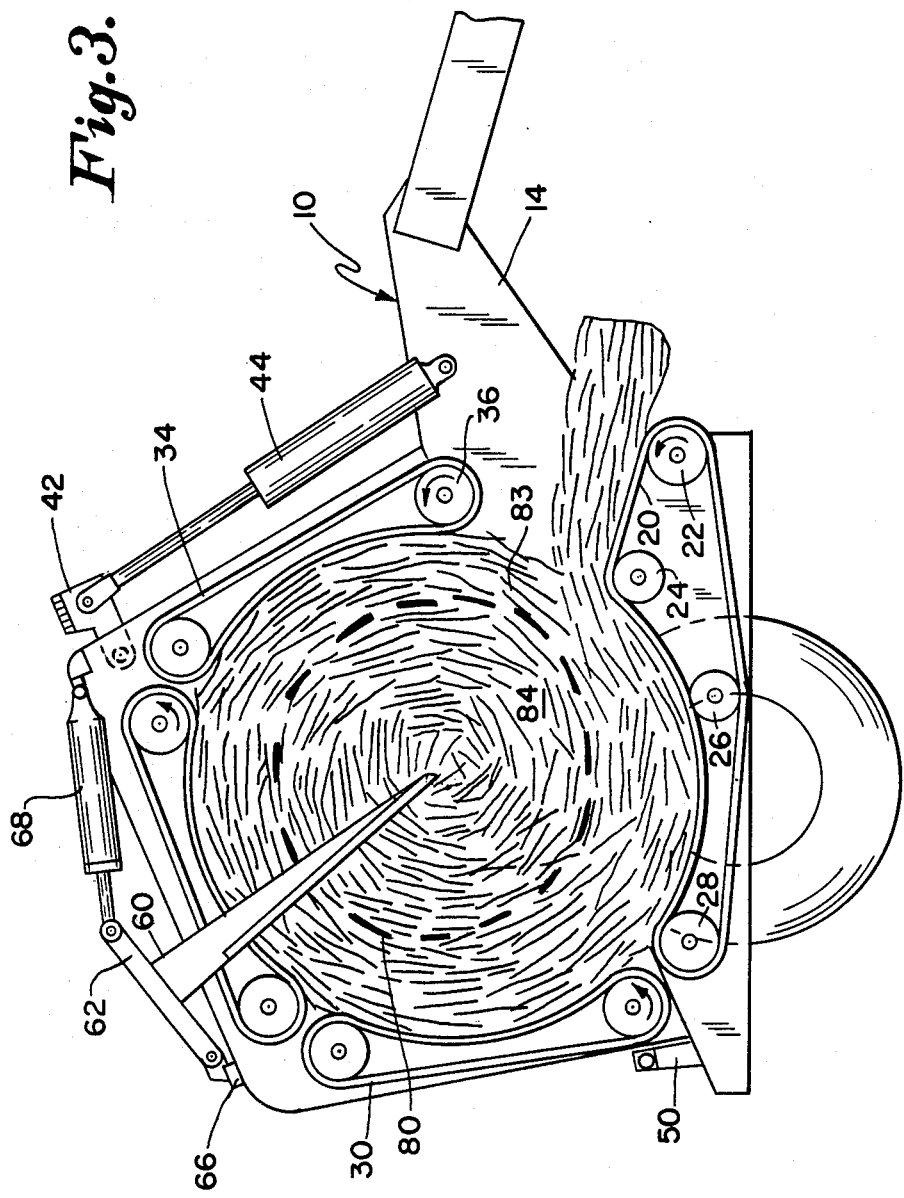
FIG. 3 is a cutaway view showing the knife in the activated position.

Prior to raising the tailgate for discharge of the completed bale, the slicing event is initiated. Slicing can be accomplished by knife 60 as shown in FIGS. 1-3. FIGS. 1 and 2 show knife 60 in its retracted state, and FIG. 3 shows knife 60 cutting the bale of agricultural forage. As may be seen in FIG. 1, the knife assembly is mounted on the top of baler subframe 40. An opening is made in the top covering of the baler at a central location wherein knife 60 can be inserted between adjacent circumferential belt elements. In the unit reduced to practice, the tailgate latch assembly comprising lever 58, cable 43, and pulley 45 were moved to one side. At the clevis at the top end of the baler, an offset was introduced into pivot arm 42 so that hydraulic cylinder 44 could remain in the center.

The butt end of knife 60 was attached to the central region of crossbar 62. As may be seen in FIG. 1, crossbar 62 comprises two adjacent plates. One end of crossbar 62 is pivotally attached to a box frame member 66 which spans the width of the baler and is secured at its ends to the frame members of subframe 40. The second end of crossbar 62 is pivotally attached by pin 64 to the shaft of hydraulic cylinder 68. The base end of hydraulic cylinder 68 is pivotally secured to the front of subframe 40 by means of pivot pin 70.

When the shaft of hydraulic cylinder 68 is extended to its maximum throw value, the condition shown in FIG. 2 pertains. When the shaft of hydraulic cylinder 68 is drawn into its minimum value, the situation shown in FIG. 3 pertains. The length of crossbar 62, the throw value of hydraulic cylinder 68 and the placement of knife 60 with respect to crossbar 62 determines whether the front and rear edge of knife 60 clears both rollers 35 and 33 during retraction and actuation. The goal is to have knife 60 of sufficient length so that in its actuated state, the tip of the blade will reach the center of the bale. Since the direction of rotation of the bale is clockwise as shown in FIG. 3, the lower bottom edge of knife 60 is sharpened. In the unit reduced to practice, the cutting edge of knife 60 was ground to a smooth edge. However, it is anticipated that some implementation would function better if the cutting edge of blade 60 was sharpened in a serrated manner.

While the invention was reduced to practice in a baler having a fixed size cavity, it is considered equally applicable for implementation in balers having variable sized cavities enclosed by spring loaded belts.

Once the bale has been formed, tied off with wire or twine, and divided into two generally equal portions, it is ready for discharge. Discharge is accomplished by release of tailgate latches, the raising of tailgate about pivot point 36 and ejection of the two bales through the opening thus formed. Subsequent to discharge of the bales, the tailgate can be closed and collection of crop material from the windrow commenced.

Figure 4:
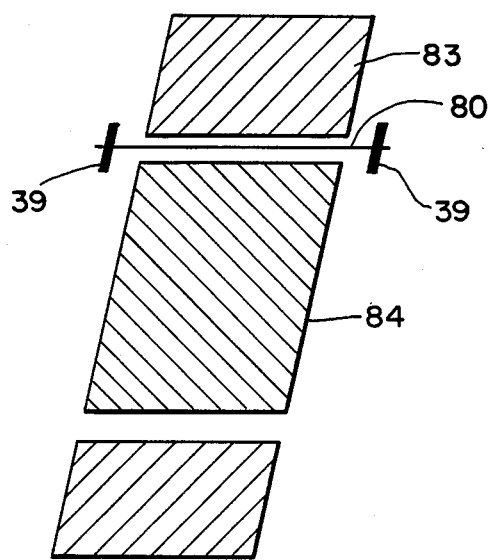
FIG. 4 is a cross-sectional representation of one form of a ring and cylinder formed by one embodiment of the invention.
Figure 5:
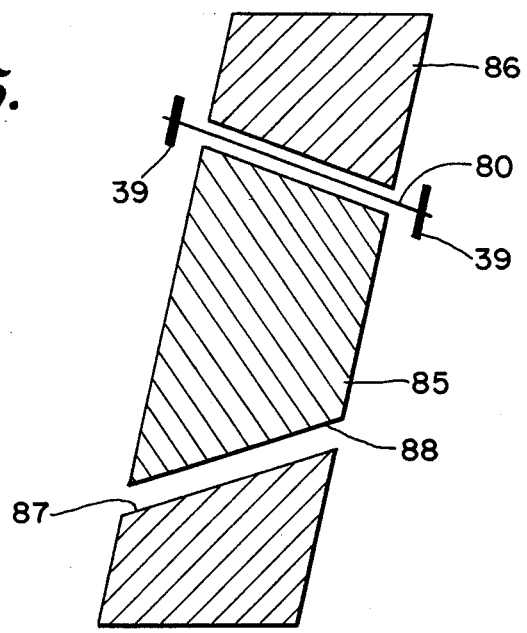
FIG. 5 is a cross-sectional representation of the conical core and conforming ring member constructed by another embodiment of the invention.

The particular invention covered by this specification and claims is directed to a knife means for cutting into the side of a bale to produce ring-shaped bodies 83 surrounded by a central cylindrical core 84 as shown in FIG. 4 or conical-shaped core 85 surrounded by a ring-shaped body 86 having an internal surface 87 conforming to the exterior surface 88 of the conical-shaped core 85 as shown in FIG. 5.

The ring-shaped members are made preferably by inserting a cutter bar 80 through the bale chamber before the crop is gathered. The cutter bar 80 passes through a pair of opposite-spaced slots 82 in the sidewalls 39 of the baler. As the bale is formed and continues to rotate, the cutter bar 80 will cut a circular groove in the bale as shown in FIG. 3 if the cutter bar 80 is aligned parallel to the axis of rotation of the baler. If the cutter bar 80 is aligned so that it is angularly inclined relative to the axis of rotation, the conical members as shown in FIG. 5 will be generated as the baler rotates within the bale chamber. To eject the finished segmented bale, the cutter bar 80 is removed and the bale ejected in the usual way.

In the event one intends to cut shallow grooves into the sides of a finished bale, a hydraulic actuated knife similar to that shown in FIG. 1 can be mounted on either or both of the sidewalls 39 and reciprocated into and out of the bale after it was formed and before it is ejected.

A plurality of cutter bars or knives may be placed at different radial distances to produce a plurality of circular grooves for ventilating, for example.

Auxilary devices such as a sprayer may be built into a knife for the purpose of spraying a liquid or gas such as a preservative, nutrient, etc. into the interior of the base.

Various other modifications will be apparent to thosed skilled in the art and therefore the invention should not be limited to the specific illustration disclosed, but only by the following claims.

I claim:

1. A slicing means for a round baler having generally a cylindrically-shaped baling chamber defined by a peripheral member joining spaced-apart sidewalls, the invention comprising:
    knife means mounted on a sidewall and movable laterally into the baling chamber through the sidewall for cutting into a rotating bale thereby producing a core and an essentially ring-shaped member.

2. A slicing means as defined in claim 1 where the knife is moved parallel to the axis of rotation.

3. A slicing means as defined in claim 1 where the knife is moved along a line angularly inclined relative to the axis of rotation to produce a conical surface of rotation.

4. A slicing means for a round baler having generally a cylindrically-shaped baling chamber defined by a peripheral member joining spaced-apart sidewalls, the invention comprising:
    cutting means mounted on a sidewall and projecting into the baling chamber through a sidewall for cutting into a rotating bale thereby producing a core and an essentially ring-shaped member.

5. A slicing means as defined in claim 4 where the knife is parallel to the axis of rotation.

6. A slicing means as defined in claim 4 where the knife is angularly inclined relative to the axis of rotation to produce a conical surface of rotation.

* * * * *